(12) United States Patent
Griess et al.

(10) Patent No.: US 8,752,791 B2
(45) Date of Patent: Jun. 17, 2014

(54) FUSELAGE EMPLOYING MULTIFUNCTIONAL CROWN AND METHOD OF MAKING THE SAME

(75) Inventors: Kenneth Harlan Griess, Kent, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 360 days.

(21) Appl. No.: 12/944,113

(22) Filed: Nov. 11, 2010

(65) Prior Publication Data

US 2012/0119028 A1    May 17, 2012

(51) Int. Cl.
*B64C 1/06* (2006.01)
(52) U.S. Cl.
USPC ........................................ 244/119; 244/117 R
(58) Field of Classification Search
USPC .................. 244/117 R, 118.5, 119, 129.1
See application file for complete search history.

(56) References Cited

U.S. PATENT DOCUMENTS

| D539,210 | S | 3/2007 | Guard et al. |
|---|---|---|---|
| 7,252,267 | B2 | 8/2007 | Young et al. |
| 7,293,739 | B2 | 11/2007 | Young et al. |
| 7,380,752 | B2 | 6/2008 | Guard et al. |
| 7,735,779 | B2 | 6/2010 | Griess et al. |
| 7,861,970 | B2 | 1/2011 | Griess et al. |
| 8,040,243 | B2 | 10/2011 | Bommer et al. |
| 2007/0095982 | A1* | 5/2007 | Kismarton et al. ............ 244/119 |
| 2008/0105785 | A1* | 5/2008 | Griess et al. .................. 244/120 |
| 2008/0128551 | A1* | 6/2008 | Young et al. .................. 244/119 |
| 2010/0123583 | A1 | 5/2010 | Bommer et al. |
| 2010/0318243 | A1* | 12/2010 | Lewis et al. ....................... 701/3 |
| 2011/0018686 | A1* | 1/2011 | Fahley et al. ................. 340/10.1 |

* cited by examiner

*Primary Examiner* — Timothy D Collins
*Assistant Examiner* — Nicholas McFall
(74) *Attorney, Agent, or Firm* — Yee & Associates, P.C.

(57) ABSTRACT

A fuselage structure includes a fuselage body and framework for stiffening the body. The framework includes at least one frame member having a duct therein for routing a utility through the body.

12 Claims, 9 Drawing Sheets

FUSELAGE EMPLOYING MULTIFUNCTIONAL CROWN AND METHOD OF MAKING THE SAME

TECHNICAL FIELD

This disclosure generally relates to fuselage structures, especially those formed of composites, and deals more particularly with a fuselage having a multifunctional crown.

BACKGROUND

Polymer-based composites may be selected for use in fabricating aircraft structures because of their favorable strength-to-weight ratio. Current designs for aircraft fuselage may employ a number of composite components, including sandwich panels, frames and stiffeners, to name only a few. The assembly of these composite components during the fabrication process may be time consuming and labor intensive, consequently, it is desirable to integrate these components where possible, in order to reduce assembly time and/or labor as well as aircraft weight.

Assembly time/labor as well as aircraft weight may also be reduced by simplifying onboard aircraft subsystems such as environmental control systems (ECS), electrical wiring and communication systems. The problem of reducing the number of composite structural components and simplifying onboard subsystems is complicated by the fact that larger commercial and military aircraft fuselages are fabricated in sections that must be joined together during the production process.

Accordingly, there is a need for a composite aircraft fuselage having a reduced number of components requiring assembly while integrating at least portions of aircraft subsystems in order to reduce costs and aircraft weight. There is also a need for a method of fabricating a composite aircraft fuselage which allows integration of subsystems during assembly of the fuselage sections while increasing production rates.

SUMMARY

The disclosed embodiments provide a composite fuselage structure having a multifunctional crown that integrates one or more aircraft subsystems, thereby reducing the number of components requiring assembly. The multifunctional crown provides a unitized design exhibiting improved strength and impact resistance to object strikes, such as hail. Integration of aircraft subsystems into the multi-functional crown may result in improvements in manufacturing and structural efficiencies, energy transport and remote structural health and moisture ingress monitoring. The multifunctional fuselage crown provides shielded pathways for transmission of RF (radio frequency) through the aircraft. These shielded pathways may be used to supply RF energy to structural health monitoring sensors and/or for data communications. The pathways are formed by one or more waveguide cavities integrated into the crown which provides shielding from the ambient environment, which may reduce disruptions in communication links.

Wireless communication through the integrated waveguide cavity may result in higher data rates, longer range, larger capacity and lower operating power. The use of the multi-function crown as a waveguide cavity may allow nondestructive evaluation (NDE) of remote areas of a unitized aircraft structure, thereby possibly obviating the need for disassembling parts of the aircraft in order to perform NDE or structural health monitoring.

According to one disclosed embodiment, a fuselage structure comprises a fuselage body having an inner surface and framework for stiffening the body. The framework includes at least one frame member attached to the inner surface and having a duct therein for routing a utility through the body. The utility may include one or more of an environmental control system, electrical wiring, a wireless communication system, a wireless electrical power delivery system and a moisture monitoring system. The duct forms an electromagnetic energy waveguide cavity allowing wireless data transmission of electromagnetic signals through the frame member. The fuselage body includes an upper portion having a crown, a cabin beneath the crown and a lower portion. The framework includes a plurality of arched frame members attached to the upper portion of the fuselage body and extending transversely across the crown. At least certain of the frame members include an integral cavity therein extending downwardly from the crown toward the cabin. The fuselage structure may further comprise an air supply duct extending longitudinally through the body in the area of the crown and coupled with the frame member cavities. The air supply duct may be integrated into each of the arched frame members and form a portion of the framework.

According to another disclosed embodiment, a fuselage structure comprises a body including an inner surface defining a cabin, and a plurality of circumferentially extending composite frame members around the cabin for reinforcing the body. Each of the frame members is attached to the inner surface of the fuselage body, and includes a utility service distribution duct therein for distributing a utility service to the cabin. The body may comprise composite panels, including an upper portion having a crown and a lower portion joined with the upper portion. Each of the frame members is joined to the panels in the upper portion of the body and spans the crown. The fuselage structure may further comprise a utility supply duct extending longitudinally through the body and coupled with the distribution ducts in the frame members. The utility supply duct may be integral with the frame members and is disposed between the crown and the cabin.

According to a further embodiment, a fuselage structure comprises a body having a crown and a frame extending longitudinally through the body for stiffening the body in the area of the crown. The frame includes at least one duct therein for routing a utility through the body.

According to a further embodiment, a method is provided of manufacturing aircraft fuselages. The method comprises laying up a composite structure over a tool and separating the composite structure into first and second fuselage skins. The method further includes forming two fuselage portions respectively using the first and second skins.

BRIEF DESCRIPTION OF THE ILLUSTRATIONS

DETAILED DESCRIPTION

Figure 1:
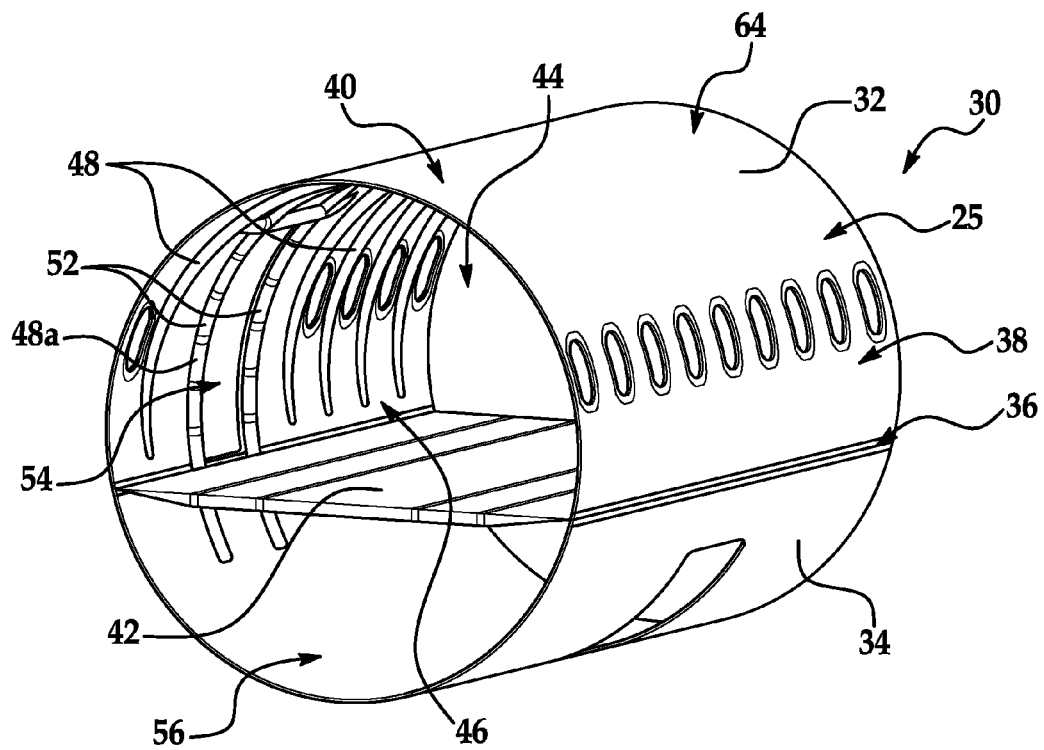
FIG. 1 is an illustration of a perspective view of an aircraft fuselage section having a multifunctional crown.
Figure 2:
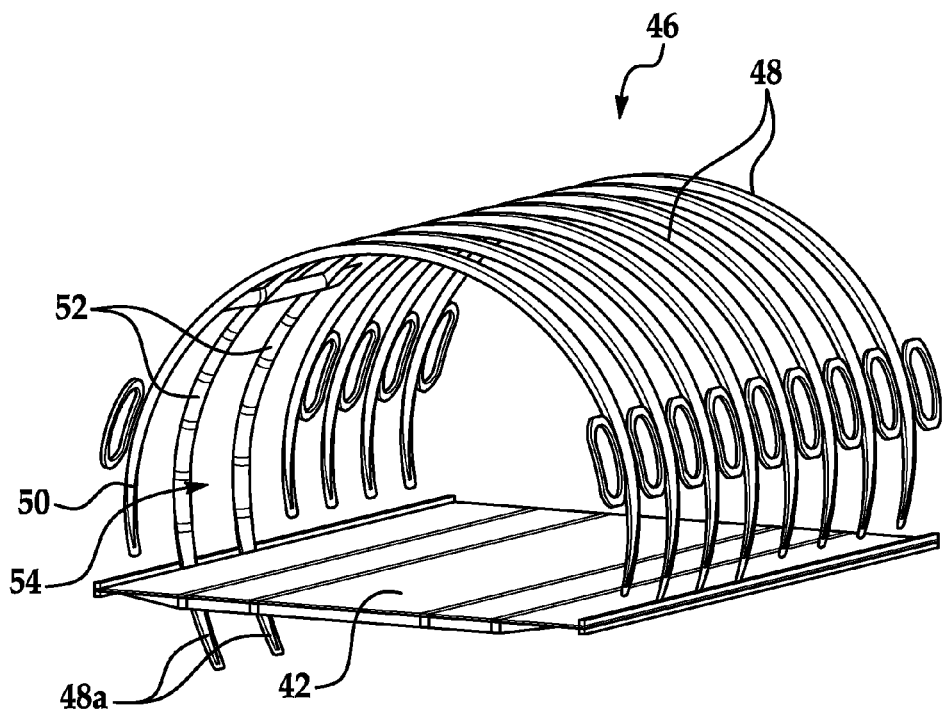
FIG. 2 is an illustration of a view similar to FIG. 1 but with the outer body panels having been removed to reveal the framework.

Referring first to FIGS. 1 and 2, a barrel-shaped fuselage section 30 comprises upper and lower fuselage portions 32, 34 respectively connected together along a longitudinally extending joint 36 which integrates the two portions 32, 34 with a unitized floor 42. During the fabrication of an aircraft (not shown), two or more of the barrel-shaped fuselage sections 30 may be joined together end-to-end to form a complete fuselage (not shown). The upper fuselage portion 32 includes sides 38 and a crown 40. As will be discussed below in more detail, each of the fuselage portions 32, 34 may be formed of composite sandwich panels (not shown) joined together to form an outer body 25 that includes an inner skin 56 defining an inner surface of the body 25 and an outer skin 64. In other embodiments, the body 25 may be formed of a single skin 56, rather than composite sandwich panels. Although the illustrated fuselage section 30 has a generally circular cross sectional shape, a variety of other cross-sectional shapes and combinations of shapes are possible, including but not limited to oval and other shapes.

The floor 42 is supported by one or more frames (not shown) or other supports (not shown) forming part of the fuselage section 30. In the illustrated embodiment, fuselage section 30 includes a single floor 42 extending across the fuselage section 30 at the level of the joint 36 to define an upper cabin 44, however, more than one floor is possible. The upper portion 32 of the fuselage section 30 is reinforced by structural framework 46 comprising a plurality of longitudinally spaced, arched structural frame members 48 which are joined to the inner surface of the body 25 defined by the inner skin 56. Frame members 48 extend circumferentially around substantially the entire perimeter of the upper fuselage portion 32, but may have extremities 50 that taper in cross sectional area in the area of the sides 38.

Depending upon the particular application and aircraft geometry, the structural framework 46 may include additional arched frame members 48a around openings such as the doorway 54 in the fuselage section 30. Depending upon structural loads of the application, the arch frame members 48 may vary in cross-sectional dimensions, overall height and length, and spacing from each other. Although not shown in FIGS. 1 and 2, the structural framework 46 may include a longitudinally extending backbone frame member in the area of the crown 40 which structurally joins the frame members 40 together and provides the fuselage section 30 with rigidity in the longitudinal direction of the aircraft. Additional details of a suitable fuselage section 30 of the type described above may be found in U.S. Pat. No. 7,735,779 issued on Jun. 15, 2010, the entire contents of which are incorporated by reference herein.

Figure 3:
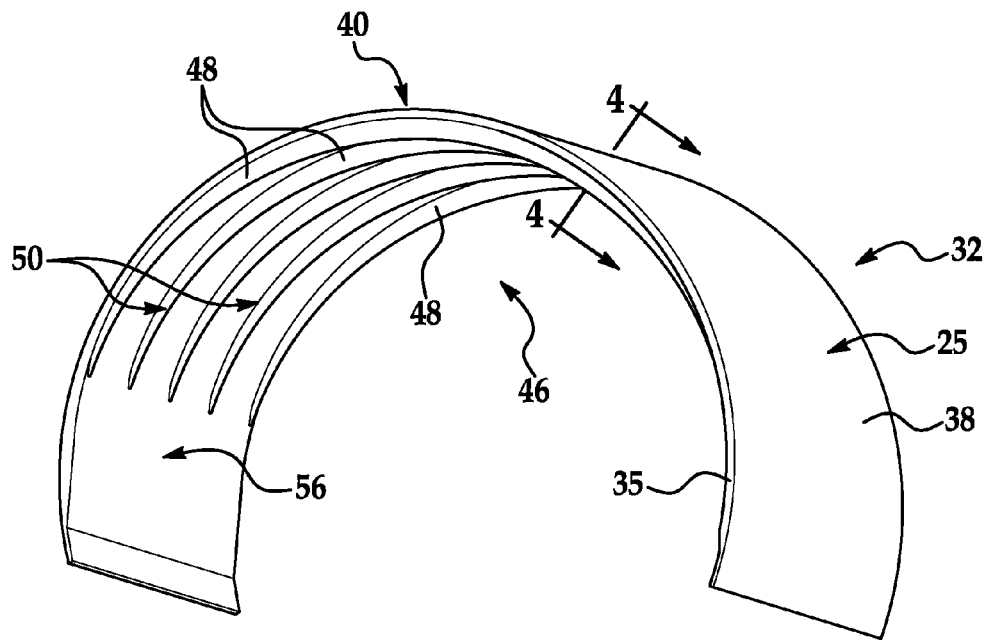
FIG. 3 is an illustration of a perspective view of an upper portion of the fuselage section shown in FIG. 1.
Figure 4:
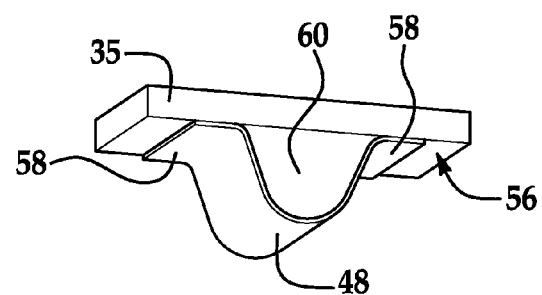
FIG. 4 is an illustration of a sectional view taken along the line 4-4 in FIG. 3.

FIGS. 3 and 4 illustrate one embodiment of the upper fuselage portion 32 having an outer body 25 formed of a solid, polymer based laminate 35 such as, for example and without limitation, carbon fiber reinforced epoxy. The sides 38 and the crown 40 are reinforced by composite, arched frame members 48. Each of the frame members 48 may have a cross section suited for the application. In the illustrated example, each of the frame members 48 is hat-shaped in cross section and includes outer flanges 58 that are secured to the inner skin 56 through co-curing, bonding and/or fasteners (not shown). For simplicity, the flanges 58 are omitted from FIGS. 3, 5, 7, 9, 11, 13, 16 and 17. Frames members 48 may be filled with a suitable structural foam 60.

Figure 5:
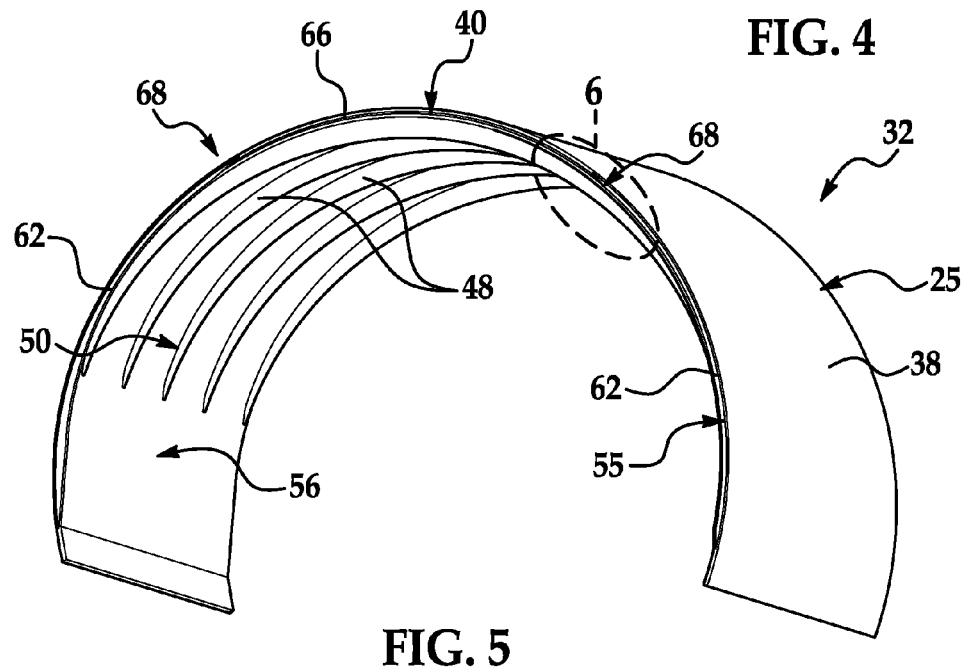
FIG. 5 is an illustration of a perspective view similar to FIG. 3 but showing an alternate form of body panel construction.
Figure 6:
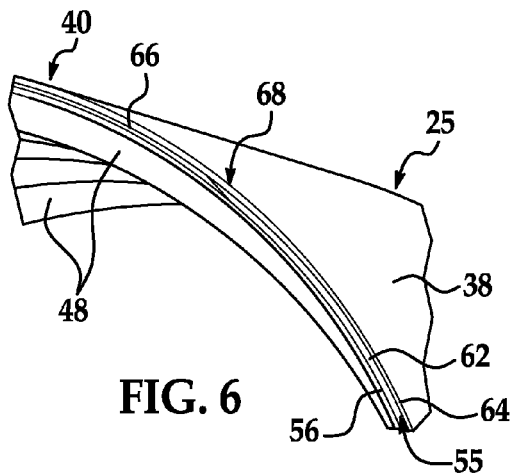
FIG. 6 is an illustration of the area designated as "6" in FIG. 5.

FIGS. 5 and 6 illustrate another embodiment of the upper fuselage portion 32 in which the outer body 25 is formed of a sandwich panel construction, comprising a core sandwiched between inner and outer face sheets 56, 64 respectively. The core 55 may comprise any suitable material and geometry such as, without limitation, flutes (not shown) or a honeycomb (not shown). In the illustrated example, the core 55 includes a relatively high density section 66 in the area of the crown 40, at a lower density section 62 in the sides 38. The high density core section provides the crown 40 with additional strength and rigidity, as well as impact resistance to objects such as hail striking the top (crown 40) of the aircraft, while the aircraft is on or near the ground. The high and low density sections 66, 62 of the core 55 may be connected together along a scarf joint 68, although other types of joints are possible, including but not limited to a lap joint, a step-lap joint, and a butt joint.

Figure 7:
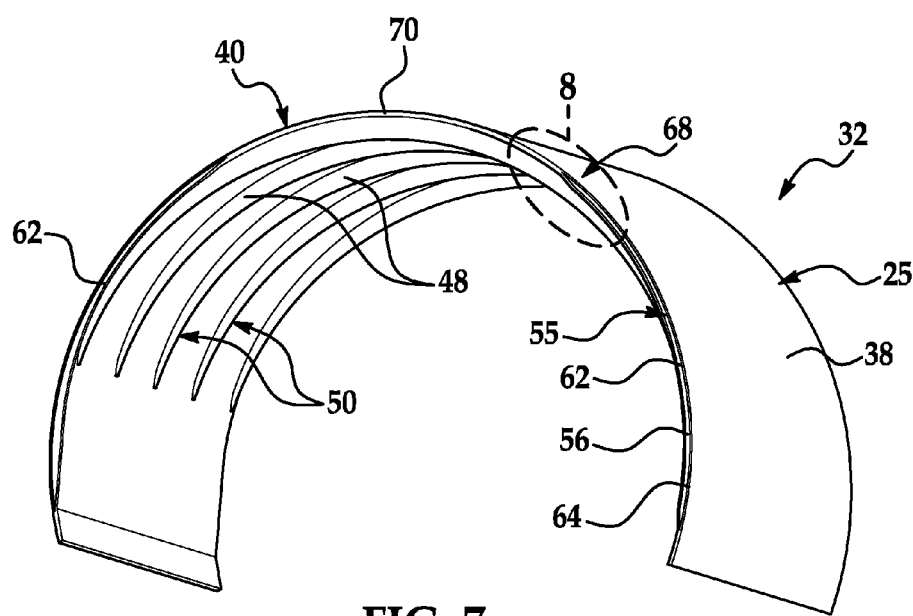
FIG. 7 is an illustration similar to FIG. 3 but showing a further embodiment of the body panel construction.
Figure 8:
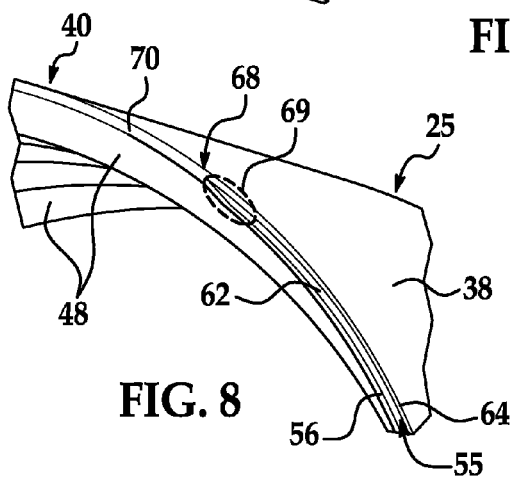
FIG. 8 is an illustration of the area designated as "8" in FIG. 7.

FIGS. 7 and 8 illustrate a further embodiment of the upper fuselage portion 32 in which the body 25 comprises a solid laminate 70 in the area of the crown 40 and a composite sandwich in the sides 38, comprising a relatively medium density core 62 sandwiched between the inner and outer face sheets 56, 64. The composite sandwich sides 38 transitions to the solid laminate 70 along a double scarf joint 68 formed by a ramp-down 69 in the core 62; other type of joints may be possible.

Figure 9:
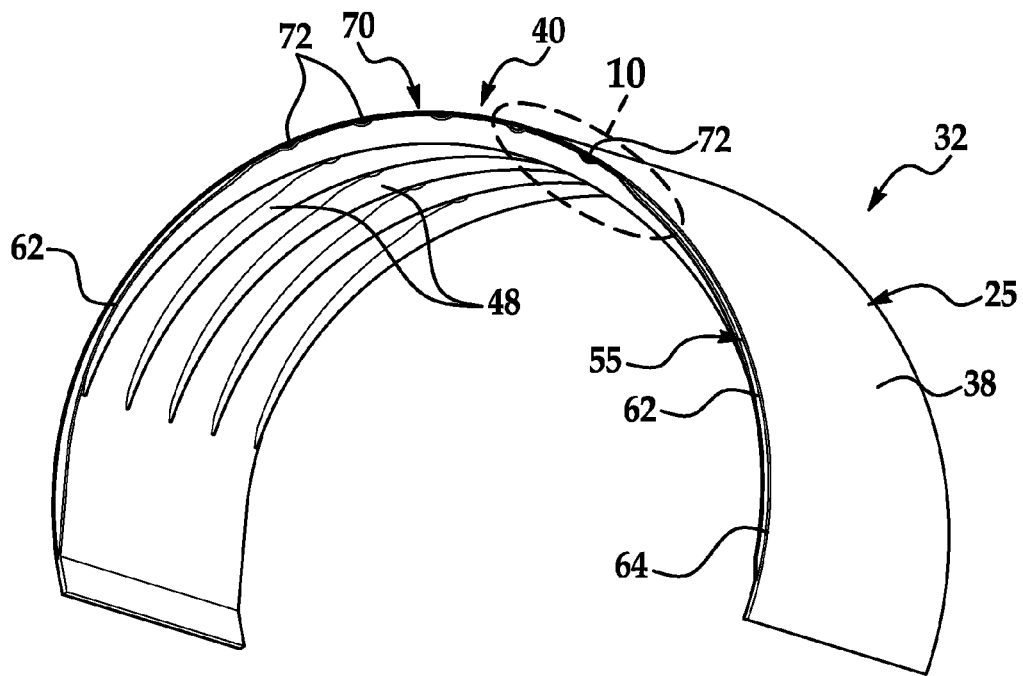
FIG. 9 is an illustration of a perspective view similar to FIG. 3 but showing another embodiment of the body panel construction.
Figure 10:
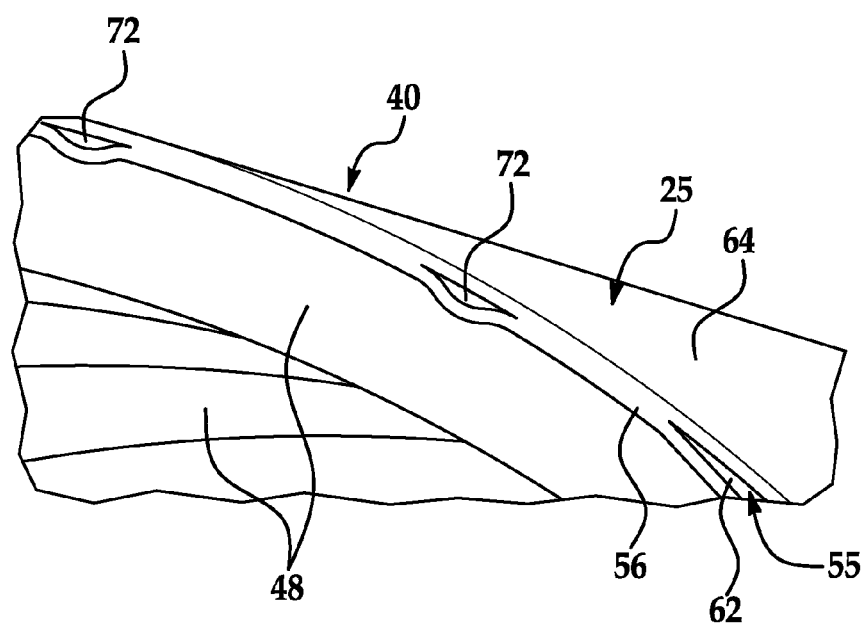
FIG. 10 is an illustration of the area designated as "10" in FIG. 9.

FIGS. 9 and 10 illustrate another embodiment of the upper fuselage portion 32 which is similar to the embodiment shown in FIGS. 7 and 8, except that the solid laminate 70 in the crown 40 is provided with longitudinally extending, high density integrated stiffeners 72 which provide the body 25 in the area of the crown 40 with additional longitudinal stiffness and stability, if required. In this example, the stiffeners 72 are circumferentially spaced from each other and are sandwiched between the inner and outer face sheets 56, 64 respectively. While FIG. 10 shows the stiffeners 72 as being located substantially in the middle between the inner and outer skins 56, 64, the stiffeners 72 may be located closer to the inner skin 56 or closer to the outer skin 64, if desired. In still other embodiments, such as that shown in FIG. 11, the stiffeners 72 may be located on the inner skin 56.

Figure 11:
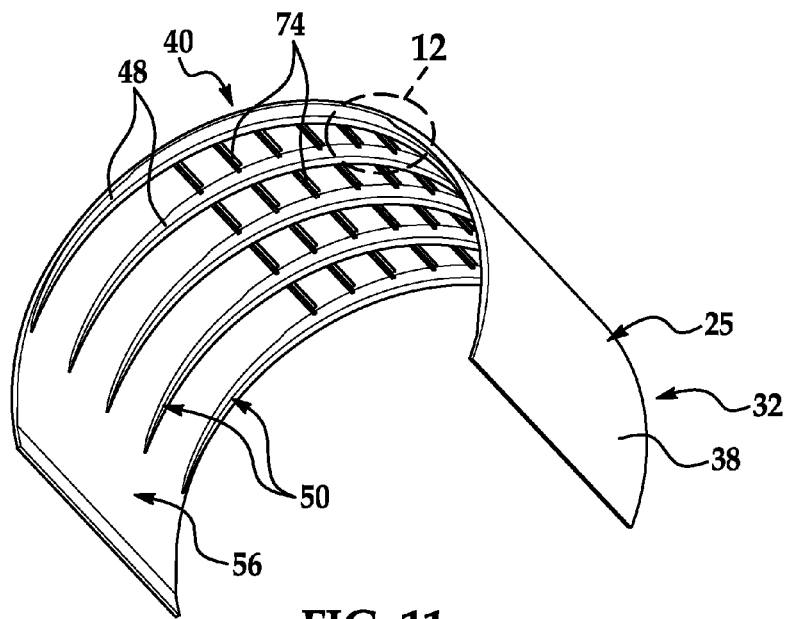
FIG. 11 is an illustration of a perspective view of an upper body portion having a crown reinforced by internal stiffeners.
Figure 12:
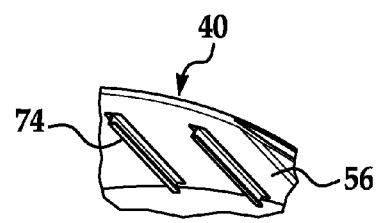
FIG. 12 is an illustration of the area designated as "12" in FIG. 11.

FIGS. 11 and 12 illustrate another technique for reinforcing and stiffening the crown 40 of the upper fuselage portion 32. In this embodiment, circumferentially spaced, longitudinally extending composite stiffeners 74 are attached to the inner skin 56 in the area of the crown 40. In the illustrated example, the stiffeners 74 have a J-shaped cross section, however a variety of other cross sectional shapes are possible. Stiffeners 74 may be attached to the inner skin 56 by bonding or other techniques. The stiffeners 74 may also provide a means of attaching equipment (not shown) or subsystems (not shown) to the body 25.

Figure 13:
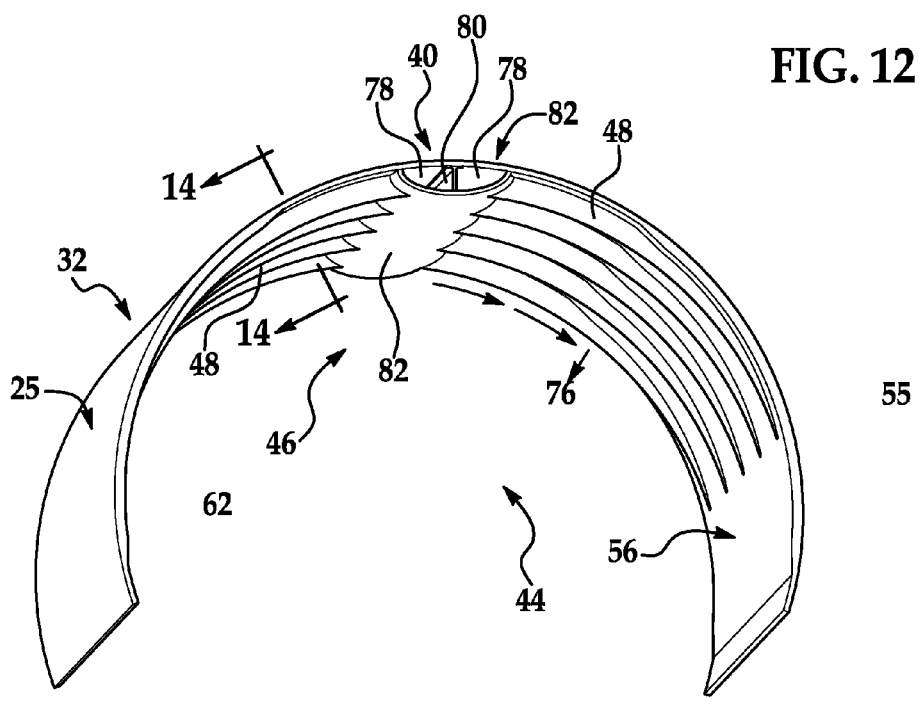
FIG. 13 is an illustration of a perspective view of another embodiment of the upper portion of a fuselage section employing a multifunctional crown.

FIG. 13 illustrates another embodiment of the upper fuselage portion 32 wherein the crown 40 is provided with a longitudinally extending, centrally located backbone frame 82. The backbone frame 82 interconnects and may be integrally formed with the arched frame members 48 to form internal structural framework 46 that is substantially unitized and stiffened in the area of the crown 40. In this example, the backbone frame 82 includes a pair of integrally formed, longitudinally extending internal ducts which are separated from each other by a central partition 80. The backbone frame 82 may comprise a composite laminate that is laid up and co-cured along with arched frame members 48 during a fabrication process that will be described below in more detail. In the illustrated embodiment, ducts 78 form port and starboard air supply ducts that carry air from a source (not shown) longitudinally through the aircraft along the crown 40.

Figure 14:
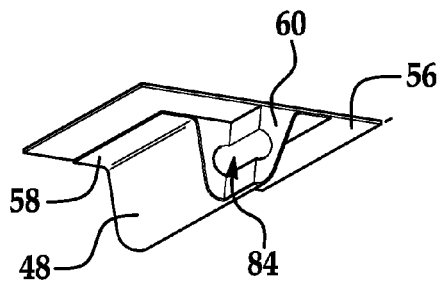
FIG. 14 is an illustration of a perspective sectional view taken along the line 14-14 in FIG. 13.

As shown in FIG. 14, one or more of the arched frame members 48 may include a distribution duct 84 that is held in place by a structural foam 60 filling the frame member 48. Each of the distribution ducts 84 is connected with one of the supply ducts 78 and functions to direct air supplied at 82 outward and downward as shown by the arrows 76 into the cabin 44. As will be discussed below in more detail, one or more ducts 78 formed by the backbone frame 82 may be employed to allow other utilities to be directed through the aircraft along the crown 40, including but not limited to other types of environmental control systems, wireless communications, hard electrical wiring, wireless power delivery and various systems for monitoring the structural health of the aircraft, including moisture monitoring systems.

Figure 15:
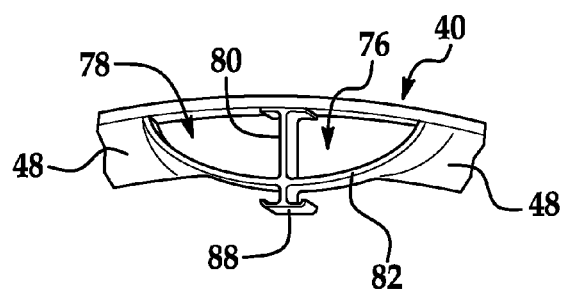
FIG. 15 is an illustration of an end view of an alternate form of the multifunctional crown.

FIG. 15 illustrates the provision of a tray 88 attached to the lower part of the backbone frame 82 which may be used to support and route onboard subsystems such as, without limitation, electrical wiring, longitudinally through the aircraft.

Figure 16:
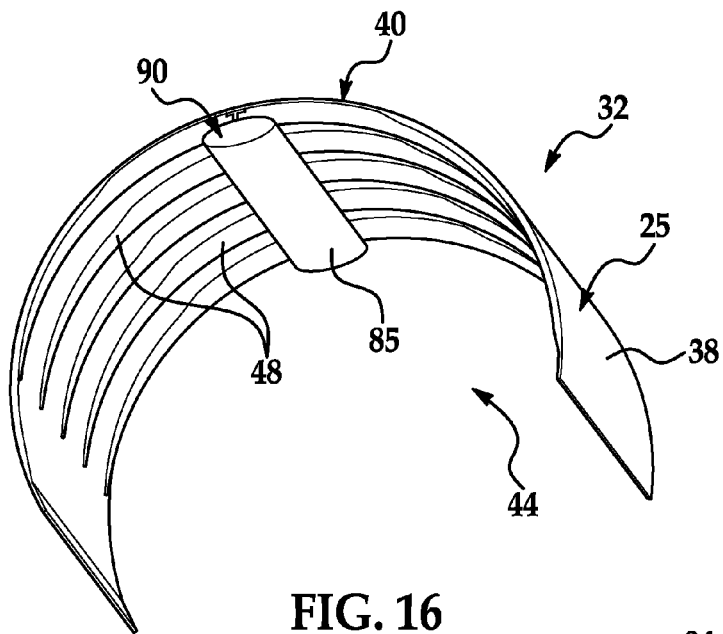
FIG. 16 is an illustration of a perspective view of an upper portion of the fuselage section employing another form of the multifunctional crown.
Figure 17:
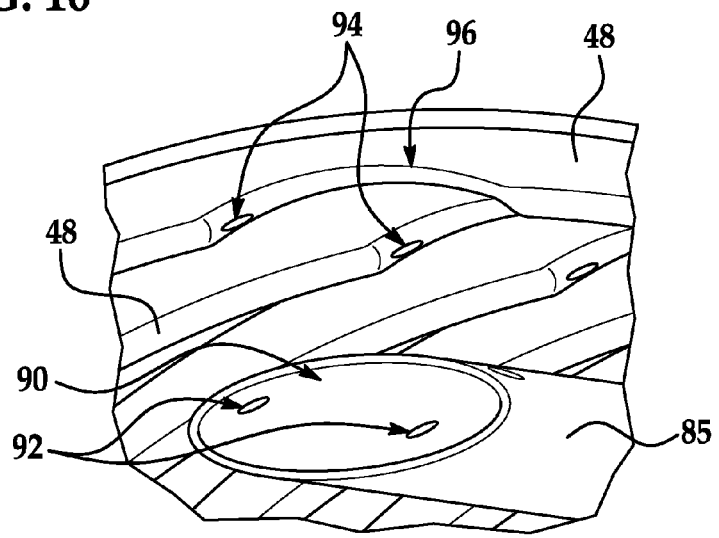
FIG. 17 is an illustration of a perspective view of the multifunctional crown shown in FIG. 16, parts being broken away in section to review the connections between the supply duct and the distribution ducts.

While FIG. 13 illustrates ducts 78 formed by the integrated backbone frame 82, it may be possible to distribute utility services through the frame members 48 using a semi-integrated central supply conduit 85 shown in FIGS. 16 and 17, which is located along the crown 40. In this example, the conduit 85 is generally oval in cross section, however other cross sectional shapes are possible. The conduit 85 is centrally located beneath the crown 40 and extends longitudinally through the upper fuselage portion 32. Each of the frame members 48 may include a recessed portion 96 having a shape substantially matching that of the conduit 85 in order to recess the conduit 85 into the frame members 48 so that the conduit 85 does not extend downwardly into the cabin 44 any more than is necessary. The conduit 85 may be formed of any suitable, relatively rigid material, including but not limited to composites.

The conduit 85 may be attached to either or both the arched frame members 48 and body 25 using fasteners, bonding techniques or interlocking mechanical mechanisms (all not shown). As seen in FIG. 17, the conduit 85 includes an internal cavity 90 through which a utility may be routed. In the illustrated example, the conduit 85 is provided with outlet openings 92 that are coupled with inlet openings 94 in the frame members 48.

Figure 18:
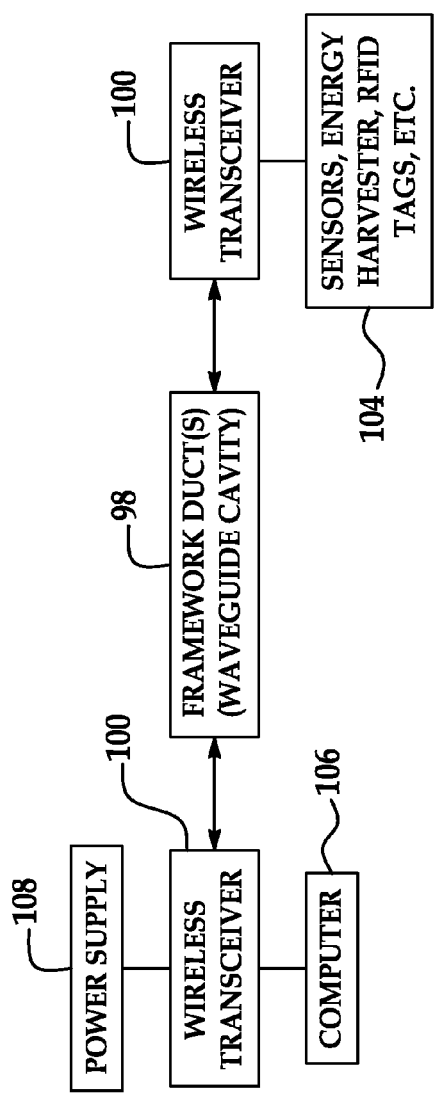
FIG. 18 is an illustration of a functional block diagram of a wireless transmission system used in fuselage structures employing the multifunctional crown.

Referring now to FIG. 18, as previously mentioned, the ducts 78, 84 formed in the structural framework 46 may be used to supply and distribute any of various utilities through the aircraft. FIG. 18 illustrates the use of the framework ducts 78, 84 as waveguide cavities used to transmit electromagnetic signals in the form of data or power through the aircraft. In one example, one or more wireless transceivers 100 positioned at longitudinally spaced locations in the aircraft, may be used to transmit data or power signals through the waveguide cavity 98 (framework ducts 78, 84). For example, any of a number of airplane heath monitoring sensors, energy harvesters, RFID tags, etc. collectively shown at 104, may be monitored at another location in the aircraft using the wireless transceivers 100 to transmit data signals.

At least one of the wireless transceivers 100 may be coupled with a suitable onboard computer 106 which may function to interrogate and/or monitor the devices 104. The wireless transceivers 100 in combination with the waveguide cavity 98 may be used to wirelessly transmit power generated by power supply 108 through the aircraft in order to power one or more of the devices 104. Alternatively, power generated by an energy harvesting device 104 may be transmitted through the waveguide cavity to batteries which may form part of the power supply 108.

Figure 19:
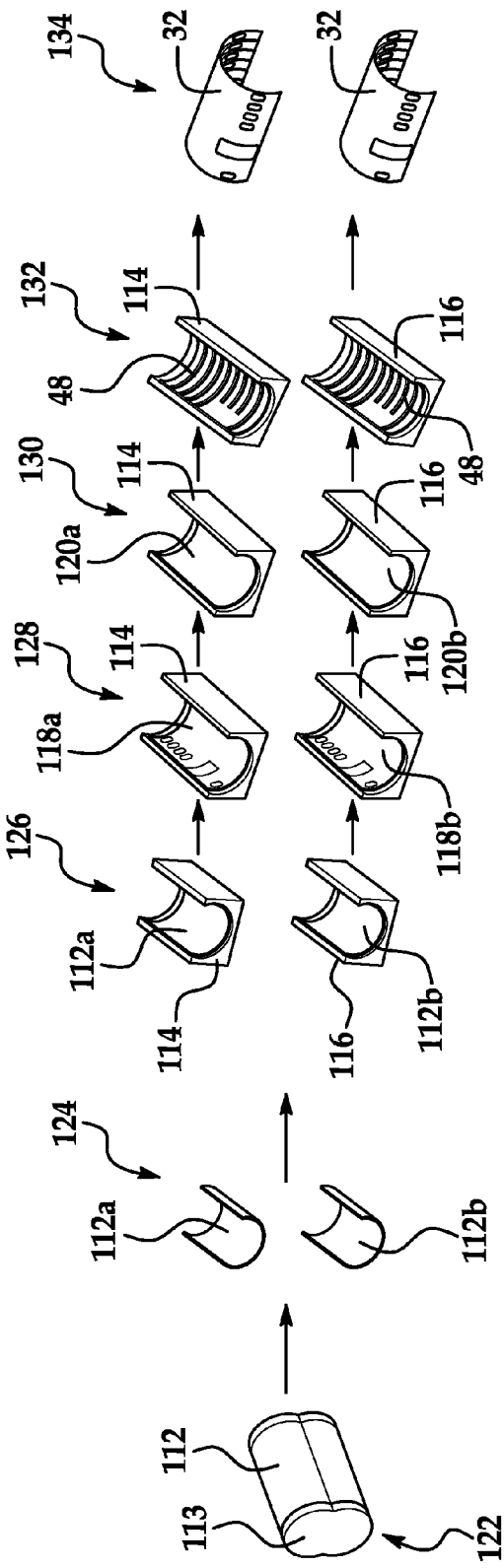
FIG. 19 is an illustration of perspective views of components, showing the steps of a method of making fuselage structures.
Figure 20:
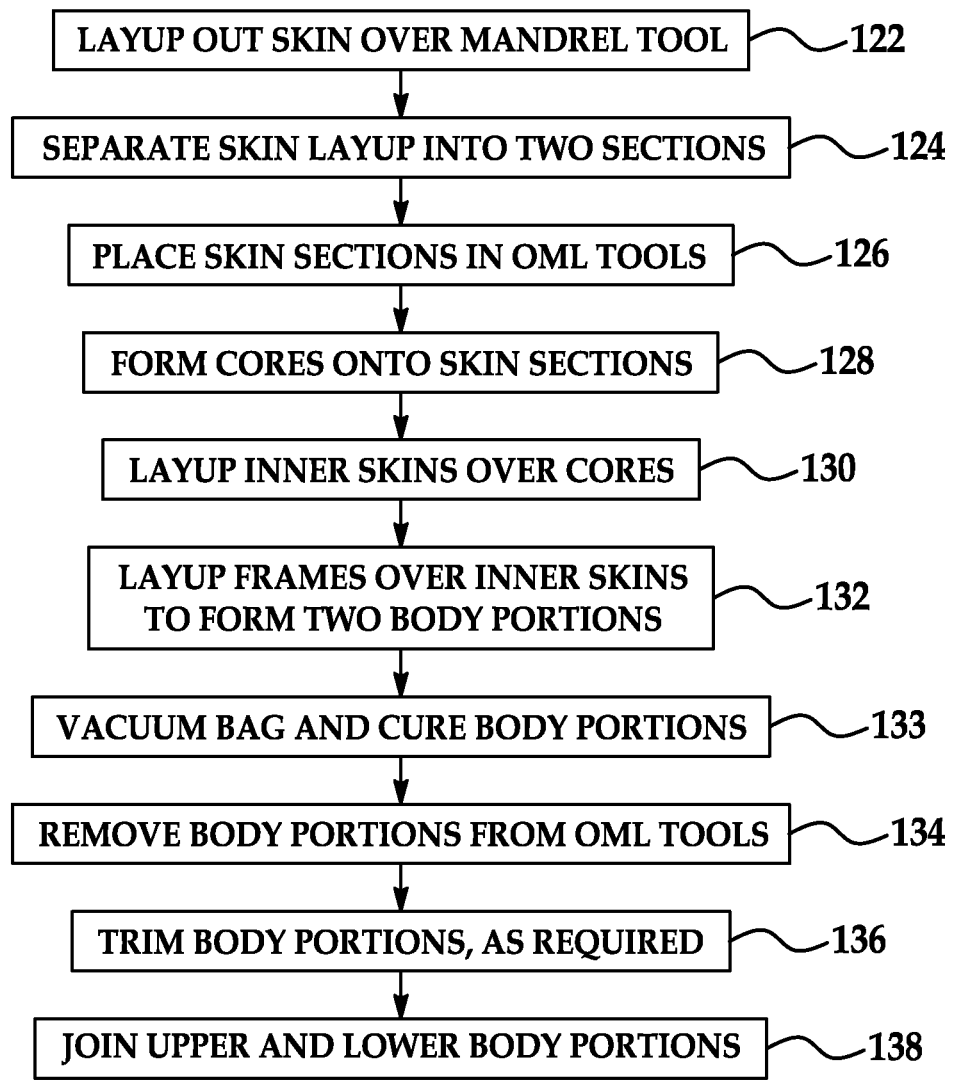
FIG. 20 is an illustration of a flow diagram of the manufacturing method illustrated in FIG. 19.

The upper fuselage portion 32 having a multifunctional crown 40 may be manufactured according to a method illustrated in FIGS. 19 and 20. Beginning at 122, composite material is laid up over a double mandrel 113 using an automatic fiber placement machine or using other conventional techniques for laying up composite material over a shaped tool. At 124, the layup 112 is cut and separated into two substantially identical outer skins 112a, 112b. At 126, the outer inner skins 112a, 112b are placed in a pair of substantially identical, outer mold line tools 114, 116. Next, at 128, foam cores 118a, 118b are laid up over the outer skins 112a, 112b. At step 130, inner skins 120a, 120b are laid up over the corresponding cores 118a, 118b, using hand placement techniques or automatic fiber placement equipment (not shown). While the above described method provides for the substantially simultaneous fabrication of two fuselage portions 32 using a single double mandrel 113, the outer skins 112a, 112b may be laid up over two separate mandrels (not shown), if desired.

While the fabrication method shown in FIG. 10 may be carried out by laying prepreg fiber plies, it may also be possible to fabricate the fuselage body portions 32, or sections thereof, using dry fiber preforms (not shown) and resin infusion techniques. For example, and without limitation, the arched frame members 48 and the backbone frame 82 may be integrally formed together using dry preforms (not shown) that are placed on the inner skins 120a shown in FIG. 19, and then co-infused with resin.

At 132, the arched frame members 48 are laid up over the inner skins 120a, 120b thereby forming two substantially identical body portions 32. At step 133 shown in FIG. 20, the laid up upper body portions 32 are vacuum bagged, processed and cured resulting in a co-cured, unitized structure. At 134, the cured body portions 32 are removed from the outer mold line tools 114, 116. At 134, the cured body portions 32 may be trimmed, as needed following which the upper body portions 32 may be joined to pre-cured lower body portions 34 (FIG. 1).

Figure 21:
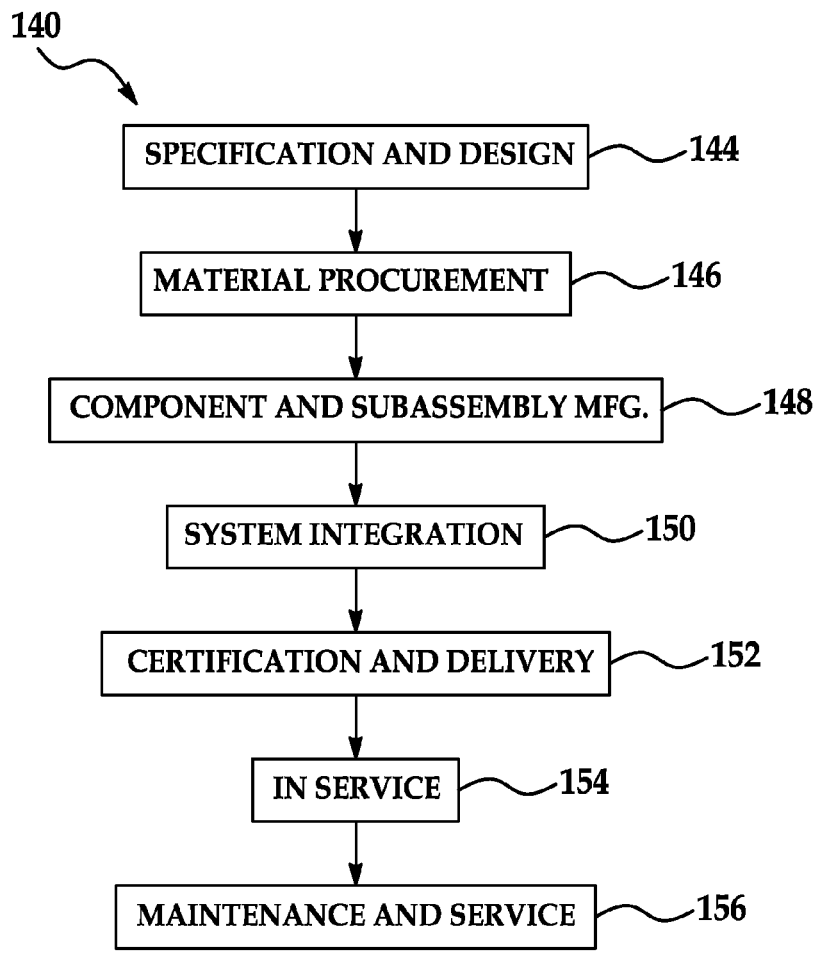
FIG. 21 is a flow diagram of aircraft production and service methodology.
Figure 22:
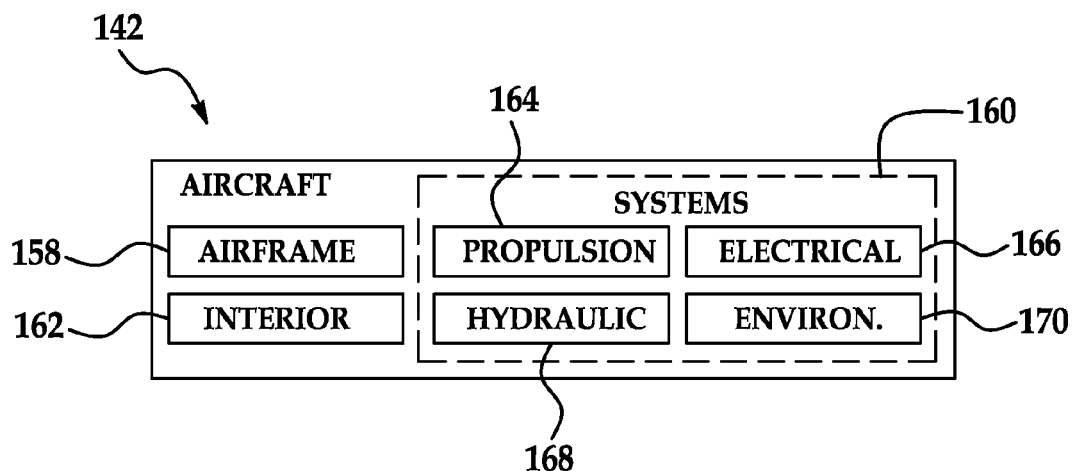
FIG. 22 is a block diagram of an aircraft.

Referring next to FIGS. 21 and 22, embodiments of the disclosure may be used in the context of an aircraft manufacturing and service method 140 as shown in FIG. 21 and an aircraft 142 as shown in FIG. 22. During pre-production, exemplary method 140 may include specification and design 144 of the aircraft 142 and material procurement 146. During production, component and subassembly manufacturing 148 and system integration 150 of the aircraft 142 takes place. During step 148, the disclosed method and apparatus may be employed to fabricate composite parts such as fuselage sections which are then assembled at step 150. Thereafter, the aircraft 142 may go through certification and delivery 152 in order to be placed in service 154. While in service by a customer, the aircraft 142 may be scheduled for routine maintenance and service 156 (which may also include modification, reconfiguration, refurbishment, and so on).

Each of the processes of method 140 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 142 produced by exemplary method 140 may include an airframe 158 with a plurality of systems 160 and an interior 162. The disclosed method and apparatus may be employed to fabricate fuselage sections which form part of the airframe 158. Examples of high-level systems 150 include one or more of a propulsion system 164, an electrical system 166, a hydraulic system 168, and an environmental system 170. Any number of other systems may be included. Although an aerospace example is shown, the principles of the invention may be applied to other industries, such as the automotive industry.

The apparatus embodied herein may be employed during any one or more of the stages of the production and service method 140. For example, components or subassemblies corresponding to production process 148 may be fabricated or manufactured in a manner similar to components or subassemblies produced while the aircraft 142 is in service. Also, one or more apparatus embodiments may be utilized during the production stages 148 and 150, for example, by substantially expediting assembly of or reducing the cost of an aircraft 142. Similarly, one or more apparatus embodiments may be utilized while the aircraft 142 is in service, for example and without limitation, to maintenance and service 156.

Although the embodiments of this disclosure have been described with respect to certain exemplary embodiments, it is to be understood that the specific embodiments are for purposes of illustration and not limitation, as other variations will occur to those of skill in the art.

What is claimed:

1. A fuselage structure, comprising:
   a fuselage body comprising an inner surface, an upper portion having a crown, a cabin beneath the crown, and a lower portion; and
   a structural framework for stiffening the fuselage body, the structural framework comprising a plurality of arched frame members attached to the inner surface of the upper portion of the fuselage body and extending transversely across the crown wherein a number of the plurality of arched frame members each is filled with a structural foam and includes a duct surrounded and supported by the foam, each duct extending downwardly from the crown toward the cabin for routing a utility through the fuselage body, in which the structural framework and the upper portion are co-cured; and
   a utility supply duct extending longitudinally through the fuselage body along the crown and coupled with each duct of the number of the plurality of arched frame members, wherein the utility supply duct forms a backbone frame and is integral with the arched frame members.

2. The fuselage structure of claim 1, wherein the utility includes at least one of:
   an environmental control system,
   electrical wiring,
   a wireless communication system,
   a wireless electrical power delivery system, and
   a moisture monitoring system.

3. The fuselage structure of claim 1, wherein:
   each duct forms an electromagnetic energy waveguide cavity, and
   the utility includes a wireless data transmission system transmitting electromagnetic signals through the waveguide cavity.

4. The fuselage structure of claim 1, wherein the utility supply duct is integrated into each of the arched frame members and forms a portion of the structural framework.

5. The fuselage structure of claim 1, wherein the fuselage body and the structural framework are formed of composite materials.

6. The fuselage structure of claim 1, wherein each of the plurality arched frame members is filled with a structural foam and includes a duct surrounded and supported by the foam.

7. The fuselage structure of claim 1, wherein:
   the fuselage body includes an upper portion having sides and a crown formed of composite panels, the panels including a core sandwiched between inner and outer facesheets, wherein the core has increased stiffness in the crown.

8. A fuselage structure of claim 1, wherein each of the arched frame members includes a recessed portion in order to recess the conduit.

9. The fuselage structure of claim 1, wherein the arched frame members have extremities that taper in cross sectional area on sides of the upper portion.

10. A method of manufacturing aircraft fuselages, comprising:
    placing an outer fuselage skin on an outer mold line tool;
    placing a core over the outer fuselage skin;
    laying up a composite inner skin over the core;
    laying up arched composite frame members and a utility supply duct over the inner skin to form a fuselage portion, the arched composite frame members extending transversely across a crown of the inner skin wherein a number of the arched frame members each is filled with a structural foam and includes a duct surrounded and supported by the foam, each duct extending downwardly from the crown toward a cabin for routing a utility, the utility supply duct extending longitudinally through the inner skin and along the crown and coupled with each duct of the number of the plurality of arched frame members, wherein the utility supply duct forms a backbone frame and is integral with the arched frame members; and curing the fuselage portion.

11. An aircraft fuselage, comprising:

an outer body formed of composite sandwich panels including a core sandwiched between an inner skin and an outer skin, the body including an upper portion having a crown and a lower portion joined to the upper portion along a longitudinally extending joint, wherein the core has a section of increased strength in an area of the crown;

a plurality of longitudinally spaced composite arched frame members joined to the inner skin of the panels in the upper portion of the body for stiffening the body in the area of the crown, at least certain of the arched frame members including a duct therein for distributing air downwardly from the area of the crown, in which the arched frame members and the upper portion are co-cured; and a longitudinally extending composite backbone frame formed integral with the arched frame members and attached to the inner skin in the area of the crown, the backbone frame including an internal duct coupled with the ducts in the arched frame members.

12. A method of manufacturing aircraft fuselages, comprising:

laying up a composite structure over a double mandrel;
cutting the composite structure into first and second outer fuselage skins;

placing the first and second outer fuselage skins respectively onto first and second outer mold line tools;

placing a core over each of the first and second outer skins;

laying up a composite inner skin over each of the cores;

laying up arched composite frame members over each of the inner skins, the arched composite frame members extending transversely across a crown of the inner skin wherein a number of the arched frame members each is filled with a structural foam and includes a duct surrounded and supported by the foam, each duct extending downwardly from the crown toward a cabin for routing a utility;

laying up a longitudinally extending composite backbone frame over each of the inner skins integrated with the arched frame members to form two upper fuselage portions, each composite backbone frame coupled with each duct of the number of the plurality of arched frame members of respective upper fuselage portions;

curing each of the upper fuselage portions; and
joining two lower fuselage portions respectively to the upper fuselage portions to form two fuselage sections.

* * * * *